(12) United States Patent
Watanabe et al.

(10) Patent No.: US 7,562,788 B2
(45) Date of Patent: Jul. 21, 2009

(54) ON-BOARD GASEOUS FUEL TANK MODULE

(75) Inventors: Hideo Watanabe, Saitama (JP); Morio Kuroki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 143 days.

(21) Appl. No.: 10/589,071

(22) PCT Filed: Feb. 22, 2005

(86) PCT No.: PCT/JP2005/003251

§ 371 (c)(1),
(2), (4) Date: Aug. 9, 2006

(87) PCT Pub. No.: WO2005/080114

PCT Pub. Date: Sep. 1, 2005

(65) Prior Publication Data

US 2007/0170180 A1    Jul. 26, 2007

(30) Foreign Application Priority Data

Feb. 24, 2004    (JP) .............................. 2004-047852

(51) Int. Cl.
*B62D 33/00* (2006.01)
*B65D 88/12* (2006.01)
(52) U.S. Cl. ....................... 220/562; 248/671
(58) Field of Classification Search ................ 220/565, 220/567.2, 581, 582, 586, 587, 23.2, 23.4, 220/23.8, 4.12, 4.14; 248/671
See application file for complete search history.

(56) References Cited

U.S. PATENT DOCUMENTS

| | | | | |
|---|---|---|---|---|
| 3,362,534 A * | 1/1968 | Kay | ........................... | 210/801 |
| 4,986,907 A * | 1/1991 | Montemayor Uzeta | ...... | 210/179 |
| 5,284,267 A * | 2/1994 | Polletta et al. | ............. | 220/4.14 |
| 5,690,813 A * | 11/1997 | Coale | ........................... | 210/86 |
| 5,869,746 A | 2/1999 | Watanabe et al. | | |
| 6,322,410 B1 * | 11/2001 | Harvey | ..................... | 440/88 R |
| 2003/0175457 A1 | 9/2003 | Jousse et al. | | |
| 2004/0182869 A1 * | 9/2004 | Kubo et al. | ................. | 220/581 |
| 2006/0096993 A1 * | 5/2006 | Takashima | ................... | 220/588 |

FOREIGN PATENT DOCUMENTS

| | | |
|---|---|---|
| DE | 3821852 A1 | 6/1988 |
| JP | 2001-113961 | 4/2001 |
| JP | 2002-106787 | 4/2002 |
| JP | 2004-257413 | 9/2004 |
| WO | WO02/18135 A1 | 3/2002 |

* cited by examiner

*Primary Examiner*—Amy J Sterling
(74) *Attorney, Agent, or Firm*—Carrier, Blackman & Associates, P.C.; William D. Blackman; Joseph P. Carrier

(57) ABSTRACT

An on-board gaseous fuel tank module includes: a support frame member; and a gaseous fuel tank fixed to the support frame member horizontally. The gaseous fuel tank includes: a cylindrical tank complete unit, a gaseous fuel inlet and outlet valve device provided at an axial end portion of the tank complete unit such that a part thereof protrudes outwardly from the tank complete unit, and a pin hole provided in the other axial end portion of the tank complete unit so as to open outwardly. An axis of the tank complete unit, an axis of the part of the valve device and a center line of the pin hole are disposed on a single straight line so that the part of the valve device and the pin hole are used to position the gaseous fuel tank horizontally.

9 Claims, 9 Drawing Sheets

ON-BOARD GASEOUS FUEL TANK MODULE

TECHNICAL FIELD

The present invention relates to an on-board gaseous fuel tank module.

BACKGROUND ART

Conventionally, as a gaseous fuel tank module of this kind, there has been known a gaseous fuel tank module having a support frame member and a gaseous fuel tank fixed to the support frame member horizontally. In this case, as the gaseous fuel tank, there has been used a gaseous fuel tank having a cylindrical tank main body and a neck portion which allows a gaseous fuel inlet and outlet valve device to be mounted in such a manner as to protrude from an axial end portion of the tank main body (for example, see JP-A-2002-106787).

DISCLOSURE OF THE INVENTION

However, since the gaseous fuel tank is provided with no means for locating the gaseous fuel tank horizontally, when attempting to fix the gaseous fuel tank to the support frame member, there has been a problem that the working efficiency in locating the gaseous fuel tank horizontally is not good.

An object of the invention is to provide the on-board gaseous fuel tank module which can solve the problem.

To attain the object, the invention provides an on-board gaseous fuel tank module including: a support frame member; and a gaseous fuel tank fixed to the support frame member horizontally. The gaseous fuel tank includes: a cylindrical tank complete unit, a gaseous fuel inlet and outlet valve device provided at an axial end portion of the tank complete unit such that a part thereof protrudes outwardly from the tank complete unit, and a pin hole provided in the other axial end portion of the tank complete unit so as to open outwardly. An axis of the tank complete unit, an axis of the part of the valve device and a center line of the pin hole are disposed on a single straight line so that the part of the valve device and the pin hole are used to position the gaseous fuel tank horizontally.

Preferably, the cylindrical tank complete unit includes: an inner shell unit, and an outer shell of a fiber reinforced polymer (hereinafter FRP) which covers the inner shell unit. The pin hole is defined by a pin hole formed body. The pin hole formed body is embedded in the outer shell unit and comprises a cylindrical body in which the pin hole is opened in an end face thereof and a mounting flange residing at the other end of the cylindrical body and joined to the inner shell unit. The opened end face of the cylindrical body is made either to be flush with or to sink from an outer surface of the outer shell unit.

According to the invention, the horizontal positioning of the gaseous fuel tank can be attained by a simple means in which the part of the valve device is held by a horizontal holding member residing on a module fabricating jig and a pin on the other horizontal holding member is fitted in the pin hole. Then, the gaseous fuel tank can be horizontally fixed to the support frame member which is located and fixed to the jig in advance.

According to the invention, since the pin hole formed body which is additionally provided on the inner shell unit protrudes in no case from the outer surface of the outer shell unit, when installed in a vehicle, there can be eliminated a risk that the pin hole formed body interferes with other components, and hence a damage can be prevented which would be made to the gaseous fuel tank by the pin hole formed body as a damage originating point. In addition, when forming the FRP outer shell unit using the filament winding process or hand lay-up process, the end portions of the inner shell unit are held by the part of the valve device and the pin hole so that the working efficiency in the forming work can be increased.

BEST MODE FOR CARRYING OUT THE INVENTION

Figure 1:
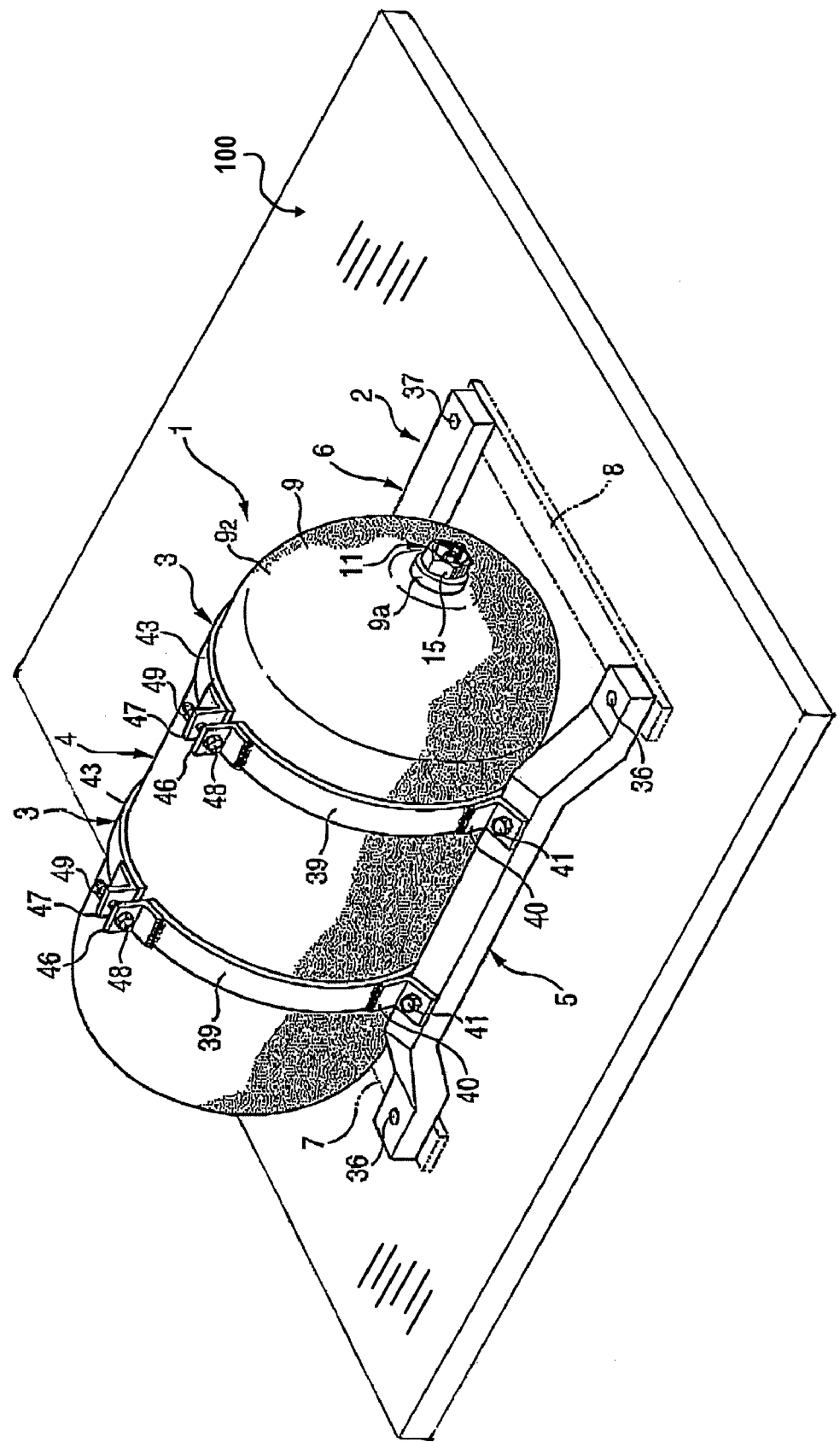
FIG. 1 is a perspective view of an on-board gaseous fuel tank module.

In FIG. 1, an on-board gaseous fuel tank module 1 has a support frame member 2 and a gaseous fuel tank 4 which is horizontally fixed onto the support frame member 2 with two metallic fixing bands 3. The support frame member 2 is made up of a front frame 5 which is disposed on a front side of a vehicle body, a rear frame 6 which is disposed on a rear side of the vehicle body, a right-side frame 7 which is disposed on the right-hand side of the vehicle body and a left-side frame 8 which is disposed on the left-hand side of the vehicle body, the right-side frame 7 and the left-side frame 8 being positioned and fixed to a portion of the vehicle body in advance, such as the vehicle portion 100 shown in the drawing.

Figure 2:
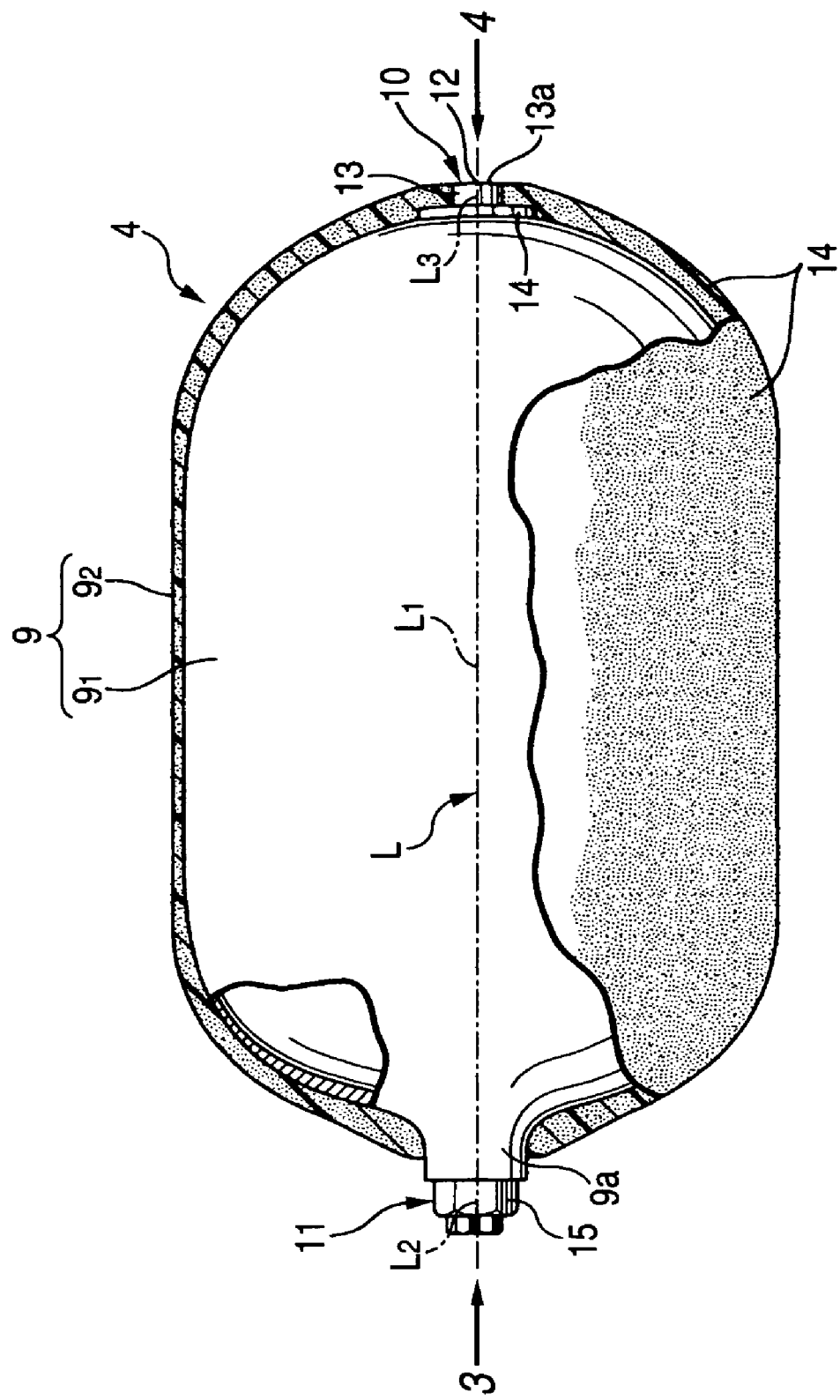
FIG. 2 is a partially broken front view showing a main part of a gaseous fuel tank.
Figure 3:
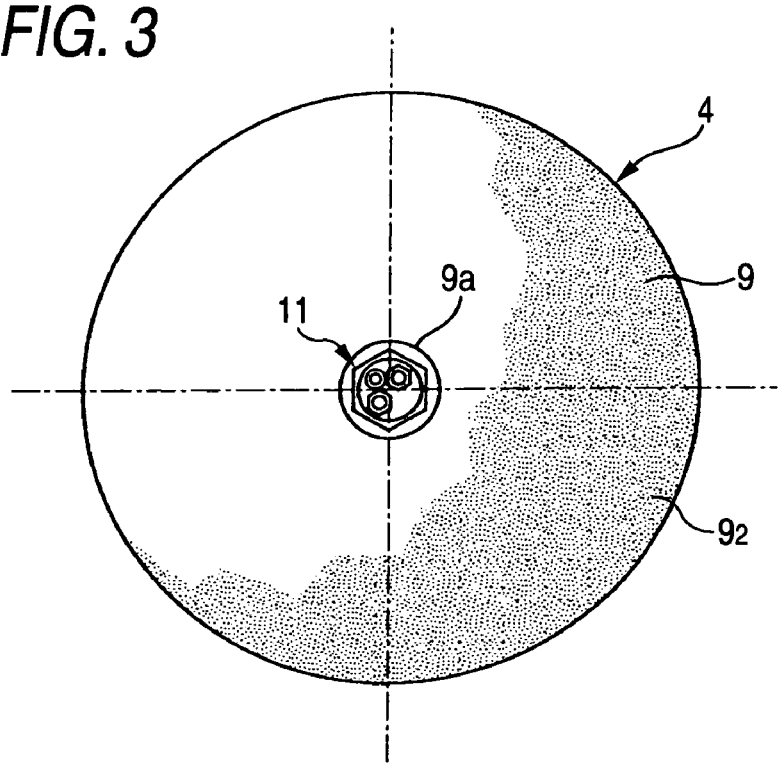
FIG. 3 is a view as seen in a direction indicated by an arrow 3 in FIG. 2.
Figure 4:
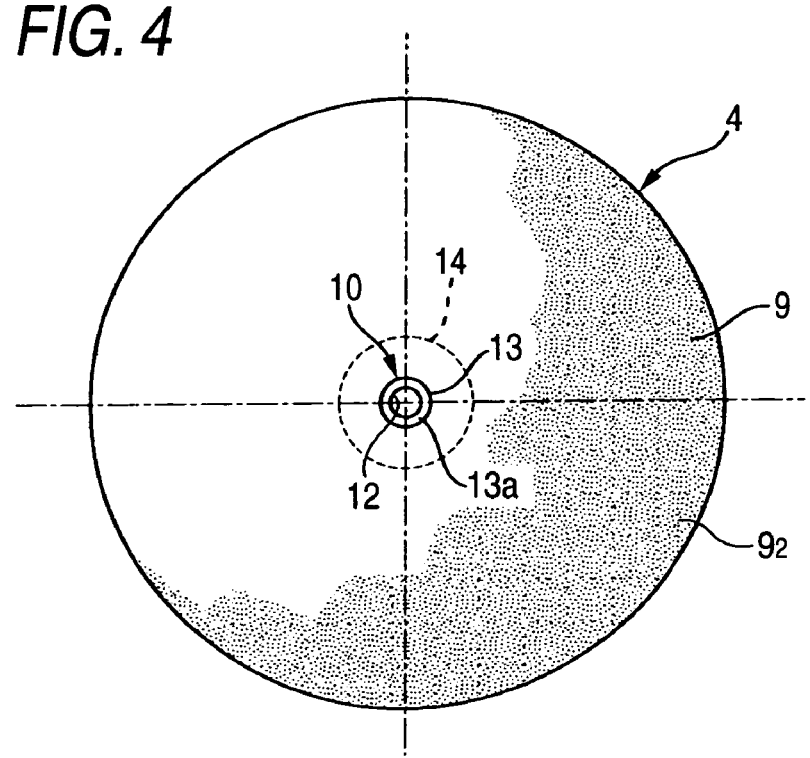
FIG. 4 is a view as seen in a direction indicated by an arrow 4 in FIG. 2.

In FIGS. 2 to 4, the gaseous fuel tank 4 includes a cylindrical tank complete unit 9, a gaseous fuel inlet and outlet valve device 11 provided at a first axial end portion of the tank complete unit 9 in such a manner that a part thereof protrudes outwardly from the tank complete unit 9 and a pin hole 12 provided in the other or second axial end portion of the tank complete unit 9 in such a manner as to open outwardly. In order for the part of the valve device 11, which is a hexagonal portion 15 in the embodiment, and the pin hole 12 to be used to position the gaseous fuel tank 4 horizontally when the tank 4 is fixed to the support frame member 2, an axis L1 of the tank complete unit 9, an axis L2 of the hexagonal portion 15 and a center line L3 of the pin hole 12 are disposed on a single straight line L.

When adopting the configuration like this, as will be described later on, the horizontal positioning of the gaseous fuel tank 4 can be attained with a simple means in which the hexagonal portion 15 is held by a horizontal holding member residing on a module fabricating jig and a pin on the other horizontal holding member is fitted in the pin hole 12. Then, the gaseous fuel tank 4 can be fixed horizontally onto the support frame member 2 or, in this embodiment, the front and rear frames 5, 6 which are positioned and fixed onto the jig in advance.

The cylindrical tank complete unit 9 is made up of an inner shell unit $9_1$ of aluminum and an outer shell unit $9_2$ of an FRP which covers the inner shell unit $9_1$. The valve device 11 is provided at a neck portion 9a of the inner shell unit $9_1$. A pin hole formed body 10 has a cylindrical body 13 in which the pin hole 12 is in one open end face thereof and a mounting flange 14 residing at the other or closed end of the cylindrical body 13 and joined to the inner shell unit $9_1$. The pin hole formed body 10 is embedded in the outer shell unit $9_2$, and an opened end face 13a of the cylindrical body 13 is made either to be flush with or recessed from an outer surface of the outer shell unit $9_2$, in this embodiment, the opened end face 13a being made to be flush with the surface.

When adopting the configuration like this, since the pin hole formed body 10 additionally provided on the inner shell unit $9_1$ protrudes in no case from the outer surface of the outer shell unit $9_2$, when installed in a vehicle, there can be eliminated a risk that the pin hole formed body 10 interferes with other components, and hence a damage can be prevented which would be made to the gaseous fuel tank 4 by the pin hole formed body 10 as a damage originating point. In addition, when forming the FRP outer shell unit $9_2$ using the filament winding process or hand lay-up process, the end portions of the inner shell unit $9_1$ are held by the hexagonal portion 15 and the pin hole 12 so that the working efficiency in the forming work can be increased.

The inner shell unit $9_1$ may be formed from a synthetic resin such as a thermoplastic plastic (HDPE or the like). In addition, in the outer shell unit $9_2$, while an epoxy resin is used as a matrix, a modified epoxy resin or the like can be substituted for this. In addition, while carbon fiber is used as a reinforcing material, glass fiber, aramid fiber or the like can be substituted for this.

Figure 5:
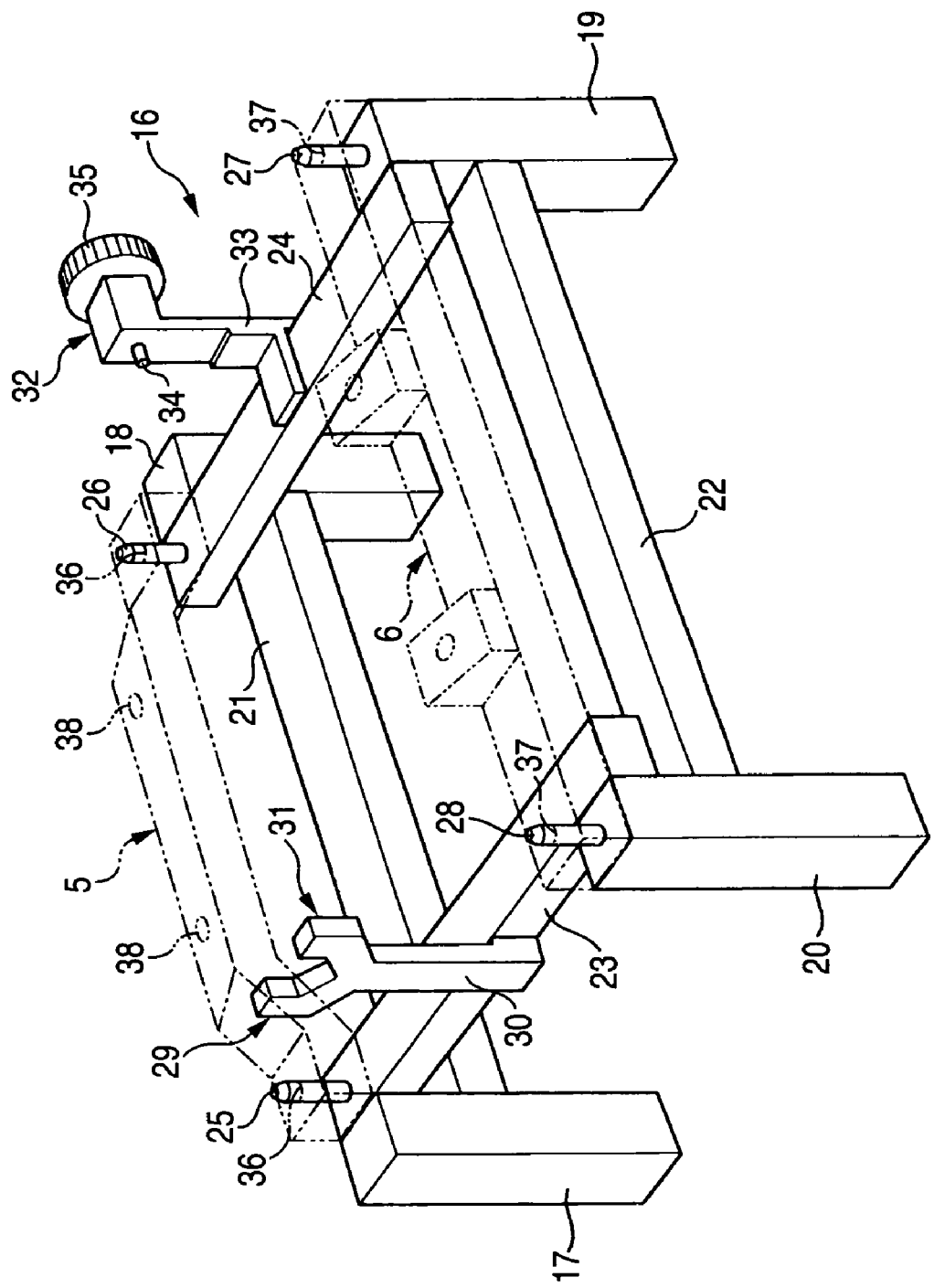
FIG. 5 is a perspective view showing a relationship between a module fabricating jig and front and rear frames.

In FIG. 5, the module fabricating jig 16 has first to fourth angular pillar-like legs 17 to 20 which are erected at four corners of an imaginary rectangular plane, and the first and second legs 17, 18, which face each other, and the third and fourth legs 19, 20, which face each other, are connected to each other between facing intermediate portions thereof by first and second connecting members 21, 22 which are disposed on longer sides of the plane, respectively. In addition, the first and fourth legs 17, 20, which face each other, and the second and third legs 18, 19, which face each other, are connected to each other between facing upper portions thereof at positions above the first and second connecting members 21, 22 by third and fourth connecting members 23, 24 which are disposed on shorter sides of the plane, respectively. Upper end faces of the first to fourth legs 17 to 20 and upper faces of the third and fourth connecting members 23, 24 reside on the same imaginary plane.

Figure 6:
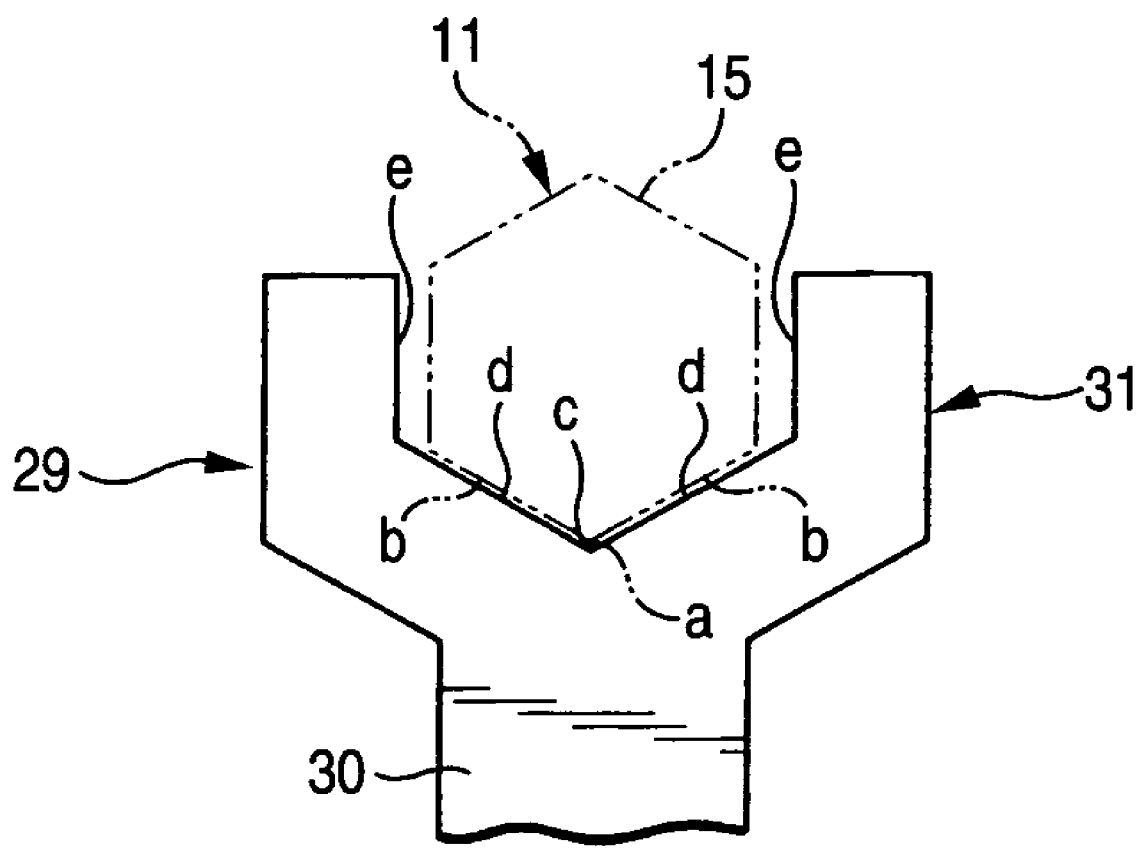
FIG. 6 is a side view showing a relationship between a first horizontal holding member and a hexagonal portion of a valve device.

First and second positioning pins 25, 26 for the front frame 5 are erected at ends of the upper faces of the third and fourth connecting members 23, 24 in the vicinity of the upper end faces of the first and second legs 17, 18, respectively, and third and fourth positioning pins 27, 28 for the rear frame 6 are erected on the upper end faces of the third and fourth legs 19, 20. Furthermore, a substantially Y-shaped first horizontal holding member 29 is erected at an intermediate portion of the third connecting member 23 with a vertical portion 30 thereof being fixed to the intermediate portion, and as also shown in FIG. 6, and an interior surface of a bifurcated portion 31 of the first horizontal holding member 29 is made up of two inclined surfaces d which confront a ridge line a and inclined surfaces b situated on sides of the ridge line a of the hexagonal portion 15 of the valve device 11 and climb down from the first and second positioning pins 25, 26 side and the third and fourth positioning pins 27, 28 side so as to form a root portion c and two vertical surfaces e which extend upwardly from upper edges of the both inclined surfaces d.

In addition, a second horizontal holding member 32 is provided at an intermediate portion of the fourth connecting member 24 in such a manner as to confront the pin hole 12 in the gaseous fuel tank 4. The member 32 has a support body 33 erected on the fourth connecting member 24, a pin 34 disposed at an upper end portion of the support body 33 in such a manner as to project from and sink into a surface thereof which confronts the first horizontal holding member 29, and a knob for operating the pin 34.

When mounting the gaseous fuel tank 4 on the support frame member 2, as shown in FIG. 5, the front frame 5 is placed on the jig 16 by passing positioning holes 36 residing in ends thereof over the first and second positioning pins 25, 26 of the jig 16, respectively. Then, the rear frame 6 is placed on the jig 16 by passing positioning holes 37 residing in ends thereof over the third and fourth positioning pins 27, 28 of the jig 16, respectively.

Figure 7:
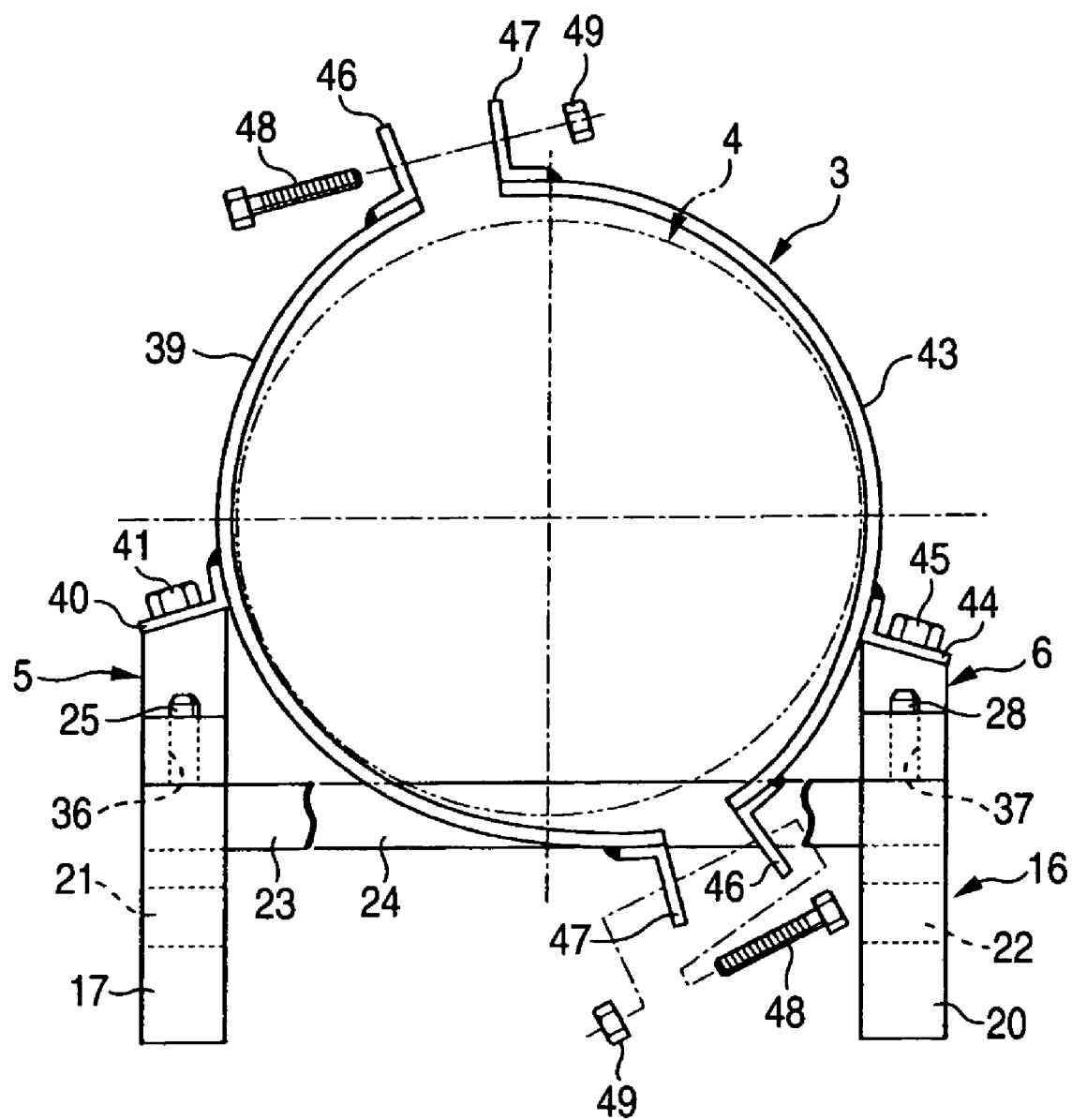
FIG. 7 is a side view showing a relationship between the module fabricating jig and the front and rear frames, the gaseous fuel tank and fixing bands.

As also shown in FIG. 7, mounting metallic fixtures 40 provided on half parts 39 of two separated fixing bands 3 are applied to positions on the front frame 5 where two band mounting holes 38 are located, so that the respective half parts 39 are mounted on the front frame 5 via bolt joints 41. In addition, mounting metallic fixtures 44 provided on the other half parts 43 are applied to positions on the rear frame 6 where two band mounting holes 42 are located, so that the respective half parts 43 are mounted on the rear frame 6 via bolt joints 45.

Figure 8:
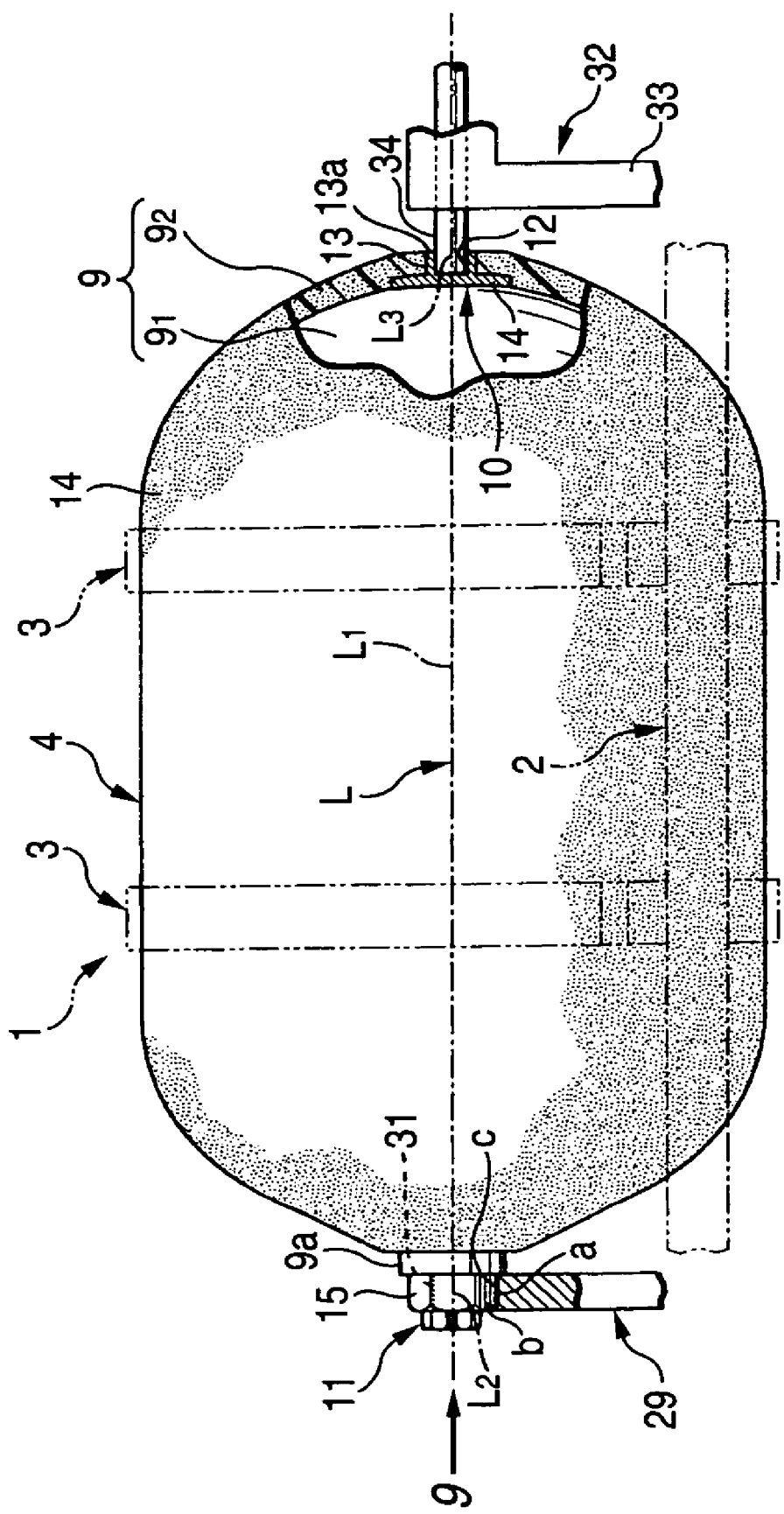
FIG. 8 is a front view showing a relationship between the gaseous fuel tank and the first and second horizontal holding members.
Figure 9:
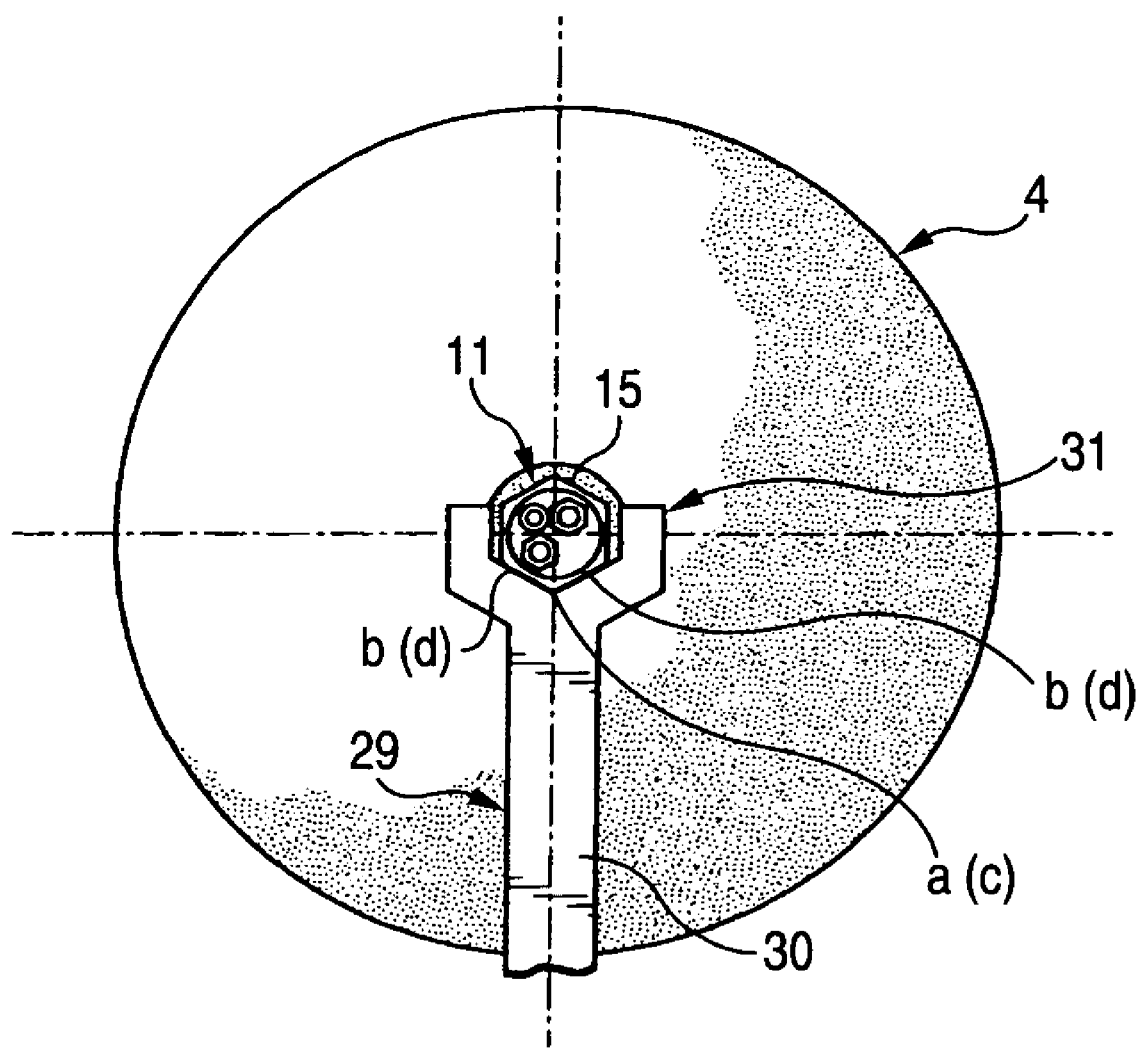
FIG. 9 is a view as seen in a direction indicated by an arrow 9 in FIG. 8.

As shown in FIGS. 6, 8, 9, with the pin 34 of the second horizontal holding member 32 being made to sink into the support body 33, the gaseous fuel tank 4 is placed between the half parts 39, 43 of the both fixing bands 3, the ridge line a of the hexagonal portion 15 of the valve device 11 is made to fit in the root portion c residing in the bifurcated portion 31 of the first horizontal holding member 29 and the inclined surfaces b situated on the both sides of the ridge line a are made to match the inclined surfaces d residing on the bifurcated portion 31, respectively, so that the hexagonal portion 15 is held in the first horizontal holding member 29, whereas the pin 34 on the second horizontal holding member 32 is fitted in the pin hole 12, so that the boss 13 is made to be held by the second horizontal holding member 32, whereby the gaseous fuel tank 4 is positioned horizontally.

Figure 10:
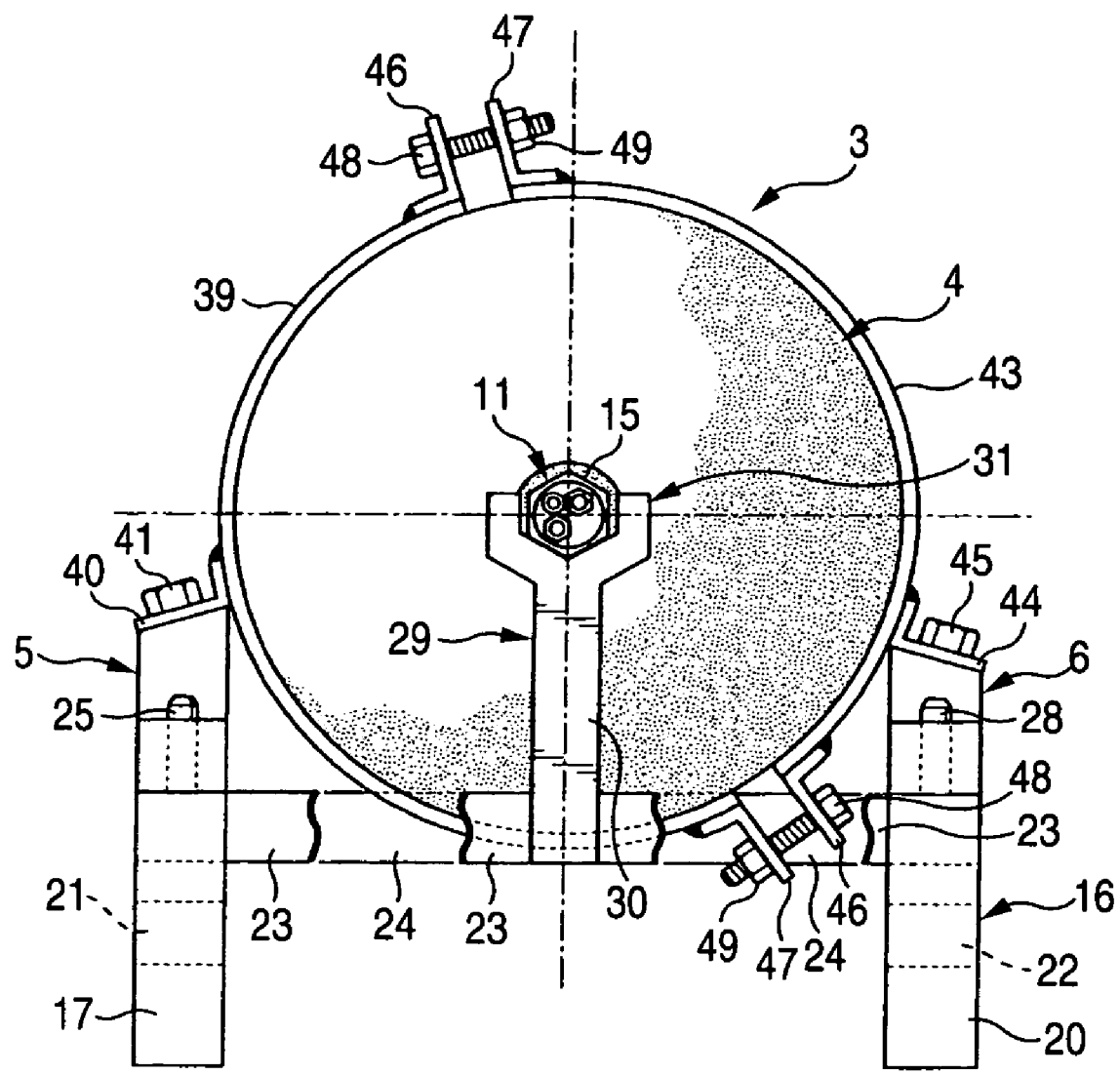
FIG. 10 is a side view showing a state in which the gaseous fuel tank is mounted on the front and rear frames with the fixing bands on the module fabricating jig.

As shown in FIGS. 7, 10, bolts 48 are passed through both fastening metallic fixtures 46, 47 which reside at ends of both the half parts 39, 43 which make a pair and face each other, and nuts 49 are screwed on the bolts 48, respectively. Then, the gaseous fuel tank 4 is mounted horizontally on the front and rear frames 5, 6 with both the fixing bands 3 while adjusting the tightening amount of the respective bolts 48 and nuts 49 so that the horizontally positioned state of the gaseous fuel tank 4 is not collapsed.

Thereafter, the front and rear frames 5, 6 and the gaseous fuel tank 4 are removed from the jig 6, and the front and rear frames 5, 6 are connected to the right-side and left-side frames 7, 8 which are positioned and fixed to a vehicle body in advance, whereby the gaseous fuel tank 4 is installed horizontally on the vehicle body.

INDUSTRIAL APPLICABILITY

As described above, this invention can be applied to an on-board gaseous fuel tank module.

The invention claimed is:

1. An on-board gaseous fuel tank module comprising:
   a support frame member; and
   a gaseous fuel tank fixed to the support frame member horizontally, the gaseous fuel tank comprising:
      a cylindrical tank unit,
         a gaseous fuel inlet and outlet valve device provided at a first axial end portion of the tank unit such that a part thereof protrudes outwardly from the tank unit, and
         a pin hole provided in a second axial end portion of the tank unit so as to open outwardly;
      wherein an axis of the tank unit, an axis of the valve device and a center line of the pin hole are disposed on a straight line, so that the valve device and the pin hole are used to position the gaseous fuel tank horizontally;
      wherein the cylindrical tank unit comprises:
         an inner shell unit, and
         an outer shell of fiber reinforced polymer which covers the inner shell unit;
      the pin hole is defined by a pin hole formed body;
      wherein the pin hole formed body is embedded in the outer shell unit and comprises a cylindrical body having an open end face in which the pin hole is formed, and a mounting flange residing at the closed end of the cylindrical body and joined to the inner shell unit; and
      wherein the open end face of the cylindrical body is flush with an outer surface of the outer shell unit.

2. The on-board gaseous fuel tank module as set forth in claim 1, wherein a hex fitting at the first axial end of the tank is supported by a support member extending perpendicularly thereto.

3. An on-board gaseous fuel tank module comprising:
   a support frame member; and
   a gaseous fuel tank fixed to the support frame member horizontally, the gaseous fuel tank comprising:
      a cylindrical tank unit,
         a gaseous fuel inlet and outlet valve device provided at a first axial end portion of the tank unit such that a part thereof protrudes outwardly from the tank unit, and
         a pin hole provided in a second axial end portion of the tank unit so as to open outwardly;
      wherein an axis of the tank unit, an axis of the valve device and a center line of the pin hole are disposed on a straight line, so that the valve device and the pin hole are used to position the gaseous fuel tank horizontally;
   said on-board gaseous fuel tank module further comprising left and right side frames which are adapted to be positioned and fixed on-board in a vehicle;
   a pin on one of the left and right side frames adapted to fit into the pin hole to position and align the tank with the frame; and
   front and rear frames connected to the left and right side frames, whereby the tank is configured to be installed horizontally on-board said vehicle.

4. The on-board gaseous fuel tank module as set forth in claim 1, wherein the cylindrical tank unit comprises a cylindrical center portion, a first axial end portion closing a first end of the cylindrical center portion and a second axial end portion closing the second end of the cylindrical center portion.

5. An on-board gaseous fuel tank module comprising:
   a support frame member; and
   a gaseous fuel tank fixed to the support frame member horizontally, the gaseous fuel tank comprising:
      a cylindrical tank unit,
         a gaseous fuel inlet and outlet valve device provided at a first axial end portion of the tank unit such that a part thereof protrudes outwardly from the tank unit, and
         a pin hole provided in a second axial end portion of the tank unit so as to open outwardly;
      wherein an axis of the tank unit, an axis of the valve device and a center line of the pin hole are disposed on a straight line, so that the valve device and the pin hole are used to position the gaseous fuel tank horizontally;
      wherein the pin hole has no inlet or outlet for gaseous fuel.

6. The on-board gaseous fuel tank module as set forth in claim 3, wherein a hex fitting at the first axial end of the tank is supported by a support member extending perpendicularly thereto.

7. The on-board gaseous fuel tank module as set forth in claim 3, wherein the cylindrical tank unit comprises a cylindrical center portion, a first axial end portion closing a first end of the cylindrical center portion and a second axial end portion closing the second end of the cylindrical center portion.

8. The on-board gaseous fuel tank module as set forth in claim 5, wherein a hex fitting at the first axial end of the tank is supported by a support member extending perpendicularly thereto.

9. The on-board gaseous fuel tank module as set forth in claim 5, wherein the cylindrical tank unit comprises a cylindrical center portion, a first axial end portion closing a first end of the cylindrical center portion and a second axial end portion closing the second end of the cylindrical center portion.

* * * * *